United States Patent
Rist et al.

(10) Patent No.: US 10,075,593 B2
(45) Date of Patent: *Sep. 11, 2018

(54) METHOD FOR OPTIMAL UTILIZATION OF AN APPLICATION-CONTROLLED QUEUE FOR CALLS THAT IS PROVIDED IN A TELECOMMUNICATION SYSTEM

(71) Applicant: Unify GmbH & Co. KG, Munich (DE)

(72) Inventors: Claus Rist, Bochum (DE); Martin Glaser, Bergkamen (DE); Michael Volkmann, Herdecke (DE)

(73) Assignee: Unify GmbH & Co. KG, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/427,490

(22) Filed: Feb. 8, 2017

(65) Prior Publication Data

US 2017/0149975 A1    May 25, 2017

Related U.S. Application Data

(63) Continuation of application No. 14/651,378, filed as application No. PCT/EP2013/003709 on Dec. 9, 2013, now Pat. No. 9,602,664.

(30) Foreign Application Priority Data

Dec. 19, 2012    (DE) .......................... 10 2012 024 882

(51) Int. Cl.
*H04M 3/00* (2006.01)
*H04M 5/00* (2006.01)
(Continued)

(52) U.S. Cl.
CPC ......... *H04M 3/523* (2013.01); *H04M 3/5166* (2013.01)

(58) Field of Classification Search
CPC ........................ H04M 3/5166; H04M 3/5232
(Continued)

(56) References Cited

U.S. PATENT DOCUMENTS 6,178,240 B1    1/2001    Walker et al.
6,650,749 B1    11/2003    Laulo
(Continued)

FOREIGN PATENT DOCUMENTS

DE    102008054143 A1    5/2009
EP    1091548 A2    4/2001

OTHER PUBLICATIONS

Written Opinion of the International Searching Authority for PCT/EP2013/003709 dated Mar. 21, 2014 (Form PCT/ISA/237).
(Continued)

*Primary Examiner* — Quynh Nguyen
(74) *Attorney, Agent, or Firm* — Buchanan Ingersoll & Rooney PC

(57)    ABSTRACT

A method for optimum utilization of a queue for calls is provided in a telecommunication system and is controlled by an application, as well as an appropriate telecommunication system. Each call that is in the queue has a particular queue property and can be assigned to an agent, to a two-way announcement that is played by an announcement memory and that is capable of interaction with a call, or to remain in the queue. The method is distinguished in that a call assigned to a two-way announcement is allocated a parameter that causes the queue property of the call to be retained.

20 Claims, 9 Drawing Sheets

(51) Int. Cl.
*H04M 3/523* (2006.01)
*H04M 3/51* (2006.01)

(58) Field of Classification Search
USPC .............................. 379/265.09, 266.01, 309
See application file for complete search history.

(56) References Cited

U.S. PATENT DOCUMENTS

| | | |
|---|---|---|
| 6,724,885 B1 | 4/2004 | Deutsch et al. |
| 2003/0031309 A1 | 2/2003 | Rupe et al. |
| 2003/0035531 A1 | 2/2003 | Brown et al. |
| 2007/0286180 A1 | 12/2007 | Marquette et al. |

OTHER PUBLICATIONS

International Search Report for PCT/EP2013/003709 dated Mar. 21, 2014 (Form PCT/ISA/210) (German).
International Search Report for PCT/EP2013/003709 dated Mar. 21, 2014 (Form PCT/ISA/210) (English Translation).

METHOD FOR OPTIMAL UTILIZATION OF AN APPLICATION-CONTROLLED QUEUE FOR CALLS THAT IS PROVIDED IN A TELECOMMUNICATION SYSTEM

CROSS-REFERENCE TO RELATED APPLICATIONS

This application is a continucation application of U.S patent application Ser. No. 14/651.378, which is the United States national stage under 35 U.S.C. § 371 of PCT International Patent Application No. PCT/EP2013/003709, filed on Dec. 9, 2013, and claiming priority to German Application No. 10 2012 024 882.2, filed on Dec. 19, 2012.

BACKGROUND OF THE INVENTION

Field of the Invention

Embodiments relate to methods for optimal utilization of an application-controlled queue that is provided in a telecommunication system, a corresponding computer program product with a machine-readable data carrier defined as its storage medium, and finally a telecommunication system.

Background of the Related Art

For call center telecommunication systems, importing UCD announcements (where UCD stands for "Universal Call Distribution," representing a call distribution unit) for queued calls in two versions with CTI (Computer Telephony Integration) applications is known. Examples of telecommunication systems used for this are HiPath 3000 and OpenScape Office. The two versions are:
a) CSTA Service Play Message and
b) CSTA Service Deflect Call,
where CSTA stands for Computer-Supported Telecommunications Applications, one of the ECMA-standardized protocol specifications, which is used for data traffic between a telephone system and computer programs.

Version a) offers the advantage that multiple callers can hear a certain announcement in one direction at the same time (i.e., bundled). This often involves connecting with standard announcement ports. However, it is not possible in this case for the queued call or the person placing the call to influence the further processing of the call.

In version b), only one call at a time can be connected to an announcement. However, this has the advantage of being able to connect the caller bi-directionally, in order to introduce appropriate control commands for influencing further processing of the queued call, such as transferring it to an agent or to a certain component of the owner or operator of the call center receiving the call. These types of control commands can be introduced, for example, using DTMF (Dual-Tone Multi-Frequency or Double-Tone Multi-Frequency), which is a multi-frequency selection process. In addition to standard announcement ports, in this case it is also possible to use announcement memories, such as media servers in particular, which are typically connected via SIP (Session Initiation Protocol) or via SIP-Q (a version of SIP) in the case of the aforementioned OpenScape Office and HiPath 3000. However, connection through other protocols, such as HTTP, is also possible.

While calls in version (a) wait in the queue, also called the system queue, calls in version (b) leave the queue automatically at the time when the call is answered by the announcement device using SIP/SIP-Q. This causes the affected call to lose its current queue properties, in particular its position in the queue and elapsed wait time. In addition, after the related announcement, it is not guaranteed that the call to which the announcement was connected will be returned to the queue or to the system queue, if in the meantime the so-called queue limit, i.e., the maximum number of places in the queue, was reached or exceeded. For a caller this would mean that the connection to the call center will be terminated at this point if he cannot be transferred to an agent immediately, because he can no longer be given a place in the queue. To circumvent this problem, until now a portion of the queue has been reserved for resequencing calls that need to return to the queue after the end of an appropriate two-way announcement. The queue limit up to which newly arrived calls are placed in the queue is normally reduced for this purpose, so that the remaining capacity of the queue can be used for "returning" or switched back calls. A working value for this queue limit is about ⅔ of the actual queue size. Disadvantages of this arrangement are, first, that the entire queue cannot be used and, second, that queue usage in the system does not correspond to queue usage in the application. Instead, queue usage in the application is the queue usage in the system plus any connected announcements. This results in the additional disadvantage that queue usage is represented differently for agents, callers, and supervisors.

BRIEF DESCRIPTION OF THE INVENTION

Embodiments may provide a method for administrating an application-controlled queue in a telecommunication system, as well as a corresponding telecommunication system, wherein the queue is optimally utilized.

The invented method can be used for an application-controlled queue for calls in a telecommunication system in which each call has a certain queue property. This type of queue property can be, for example, the call's position in the queue, i.e., its priority in the processing sequence, or the elapsed wait time. Each call "parked" in the queue can—at least initially—be assigned to remain in the queue or be assigned to an agent. Alternatively, each call can be assigned to an announcement that is played from an announcement memory and allows interaction or reciprocal action with the call. These types of announcements are designated as two-way announcements. According to the invention, if a call is assigned or connected to a two-way announcement, that call does not simply lose its queue property, such as its position or priority in the queue, but instead is assigned a parameter that causes the call to keep its queue property, which in this queue position example means that the call's corresponding place in the queue is kept open and not taken by the next call. This means that the call's return to its original position in the queue is guaranteed, and the "interim switching" of the two-way announcement—with its possible effect on the further processing of the call—will not disadvantage the caller by assigning him to the end of the queue after the announcement.

DETAILED DESCRIPTION OF THE FIGURES

Figure 1:
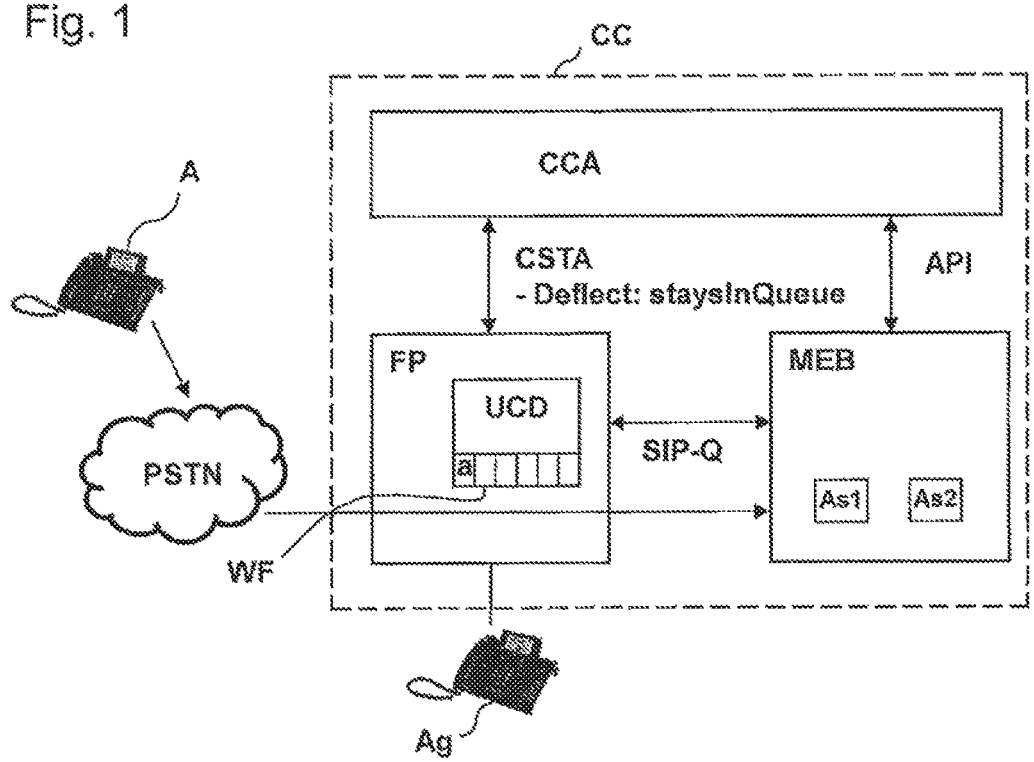
FIG. 1 an embodiment of the telecommunication system according to the invention with only one call in the queue, switched to an announcement, FIG. 2 the telecommunication system from FIG. 1 with an additional call in the queue, FIG. 3 a diagram of signaling a waiting conversation on an agent's terminal, FIG. 4 a diagram of signaling a waiting conversation on a media server, FIG. 5 another diagram of signaling the waiting conversation on the media server, FIG. 6 a diagram showing how a call is lost when a system component fails in a telecommunication system according to the prior art, FIG. 7 a diagram showing how a call is resequenced when a system component fails in a telecommunication system according to the invention, FIG. 8 a diagram showing how the queue is changed when a call is connected to an announcement in a telecommunication system according to the prior art, FIG. 9 a diagram showing the resequencing of a call when the queue limit has not been exceeded according to the prior art, FIG. 10 a diagram showing the resequencing of a call when the queue limit has been exceeded according to the prior art, FIG. 11 a diagram showing the situation of pending call resequencing and a completely filled queue according to the prior art, FIG. 12 a diagram showing a queue in a telecommunication system according to the invention, with an announcement connected to a call, FIG. 13 a diagram showing a queue in a telecommunication system according to the invention after the call to which an announcement was connected is switched back, FIG. 14 a diagram showing the queue in a telecommunication system according to the invention after a system component has failed and a call to which an announcement was connected is switched back, FIG. 15 a schematic diagram of a telecommunication system according to the prior art with a call in the queue, FIG. 16 a diagram of a known telecommunication system, with the only call in the queue having been connected to an announcement, and FIG. 17 a diagram showing a known telecommunication system, in which another call has been added to the queue.

As previously noted, embodiments can be used for an application-controlled queue for calls in a telecommunication system in which each call has a certain queue property. This type of queue property can be, for example, the call's position in the queue, i.e., its priority in the processing sequence, or the elapsed wait time. Each call "parked" in the queue can—at least initially—be assigned to remain in the queue or be assigned to an agent. Alternatively, each call can be assigned to an announcement that is played from an announcement memory and allows interaction or reciprocal action with the call. These types of announcements are designated as two-way announcements. According to the invention, if a call is assigned or connected to a two-way announcement, that call does not simply lose its queue property, such as its position or priority in the queue, but instead is assigned a parameter that causes the call to keep its queue property, which in this queue position example means that the call's corresponding place in the queue is kept open and not taken by the next call. This means that the call's return to its original position in the queue is guaranteed, and the "interim switching" of the two-way announcement—with its possible effect on the further processing of the call—will not disadvantage the caller by assigning him to the end of the queue after the announcement.

In addition, the queue can be entirely filled with new incoming calls, because no reserve spaces have to be provided for calls being returned from two-way announcements, since those calls have kept their original places in the queue. This allows for optimal utilization of the queue. Furthermore, this ensures the same queue usage in both the application and the system, and queue usage is represented in the same manner for agents, callers, and supervisors. In other words, maximum utilization of the queue is achieved. In addition, the invented method allows for better call routing, because a caller or a call can be "parked" in the queue with no problems and with no loss of caller comfort, since the queue properties acquired up to that point by the caller in question—such as priority in the queue, in particular—are not taken back every time the call is resequenced in the queue.

The transfer of the parameter containing the queue property according to the invention, in a CSTA Service Deflect Call, for example, means that the call does not logically leave the queue. This is not possible in configurations according to the prior art. Note that any designation in the Refer SIP method is equivalent to the CSTA approach.

According to a preferred embodiment of the invention, the call's position in the queue or, in other words, the call's priority in the queue represents one component of the queue property.

It is advantageous for the application to be a software program running on an application server and for the two-way announcement played from the announcement memory to assign the call that has the parameter containing the queue property using a CTI switching order. This allows the application to determine dynamically whether or not the call should remain in the queue.

It can also be advantageous if a call that is or was assigned to a two-way—i.e., interacting—announcement and then cannot be answered by an agent is put back into the queue after the end of the announcement in such a way that the queue property of the call is maintained. This means that the call in question, or the person placing the call, does not lose the advantage (in particular the processing priority) gained while waiting in the queue sequence.

The reliability of the invented method can be improved by having the queue properties of all calls in the queue be stored in such a way that they also are not lost if certain system components fail, but rather are kept in the system, in particular in the switching unit. This can ensure that calls are processed in the order they were in before the system component failure and also are not lost. This has more than a little effect on the customer satisfaction of the people using the telecommunication system. It also prevents the calls in the queue from having to be removed and therefore being lost from the system. A further advantage is that callers whose calls are in the queue are not affected by a respective system component failure, because there is no negative impact such as being "cut off," for example.

This type of emergency procedure for the possibility of the application being off line offers the advantage that calls switched to two-way announcements can now be brought back into the queue and redistributed, instead of having to be removed.

The aforementioned emergency procedure can be even further improved by having the switching unit use the stored queue properties to switch calls back into the queue that go out from or are forwarded by the announcement memory, with this preferably being done independently or automatically. For this the switching unit uses a corresponding recognition or mark to allow switching back instead of a busy signal. This also facilitates and expedites easier automatic error management after the failure of a system component.

The underlying purpose of the invention is further expressed by a computer program product or a computer program, as well as a machine-readable data carrier for its memory. The previously described features and advantages of the invented method also apply to the computer program product or computer program as well as to the data carrier and are not described again here to avoid unnecessary repetition. Telecommunication systems incorporating this technology are also contemplated herein.

A telecommunication system according to the invention includes a switching unit that provides a queue for calls and a call distribution unit. Every call in the queue has a specific queue property, which—as already described—can indicate position in the queue and wait time, for example. An agent's terminal can be connected to the switching unit, which should generally be the case for a telecommunication system in a call center in which multiple agent terminals or telephones are connected. In addition, telecommunication terminals for corresponding callers can be connected to—i.e., call into—the switching unit by means of a call over a wired or wireless telephone network, for example. The telecommunication system also has an announcement memory, which is connected to the switching unit and on which at least one two-way announcement is stored. This type of two-way announcement is distinguished in that it is capable of interacting with a call and, for example, allows the call or the person making the call to influence the further processing of the affected call and route it in a certain direction.

In addition, the telecommunication system according to the invention has an application, generally in the form of software and linked or connected to the switching unit and to the announcement memory, that is used to assign or allocate calls to an agent, to a two-way announcement played from the announcement memory, or to remain in the queue. The telecommunication system according to the invention is distinguished in that the call distribution unit is configured or designed such that it assigns a parameter to a call that has a two-way announcement assigned, which causes the call's queue property to be retained and thereby prevents the call from losing the rights and features assigned in the queue, such as processing priority or sequence, for example.

In an advantageous further embodiment of the telecommunication system according to the invention, the announcement memory is configured as a media server that is connected or linked to the switching unit via the Session Initiation Protocol (SIP). Obviously the connection between the media server and the switching unit can also be made using other protocols, such as the Hypertext Transfer Protocol (HTTP), for example.

As previously stated, the features and advantages described with regard to the invented method also apply to the invented telecommunication system and vice versa, unless specifically stated otherwise.

Additional advantages, features, and characteristics of the invention are presented in the following description of advantageous embodiments with reference to the drawings.

FIG. 1 shows a call center configuration as an example for the invented telecommunication system CC. "Call center" in this case should be considered to mean only the computer-related part of such a unit, without including the physical facilities, people, etc. The call center includes a switching unit FP (for Feature Processing), that provides or contains a queue WF for calls (for which only one call a is shown) and a call distribution unit UCD (for Universal Call Distribution). The present invention is described using the example of OpenScape Office or HiPath 3000 as components for call center operation, although the invention is not limited to these components.

The call center CC also includes an announcement memory MEB (for Media Extension Bridge), which in this example is a media server connected to the switching unit FP using SIP-Q (a version of SIP). An additional component of the call center is a call center application CCA, which is connected to the switching unit FP using CSTA and to the announcement memory MEB using API (Application Programming Interface). Different types of announcements are stored in the announcement memory MEB These include, for example, one-way or "normal" announcements As2, which can be played to multiple callers at the same time, through a CSTA Service Play Message, for example. The announcement memory MEB also contains at least one two-way announcement As1 that can be played to a call assigned to or connected to this announcement. The call center application CCA distributes call center calls to the one-way announcements As2 and the two-way announcements As1 stored in the announcement memory MEB The call center application CCA serves as the overall control for the entire call center system. (At least) one agent Ag is linked to the call center CC. In addition, a caller A can contact or call the switching unit FP through a PSTN (Public Switched Telephony Network), which can also be a mobile wireless network. The call center application CCA, with help from the switching unit FP, distributes the system's calls to announcements As1, As2, Agents Ag, and the queue WF.

The call center also has a CSTA service provider (CSP—not shown) that is used as optional middleware for a CSTA connection.

Figure 15:
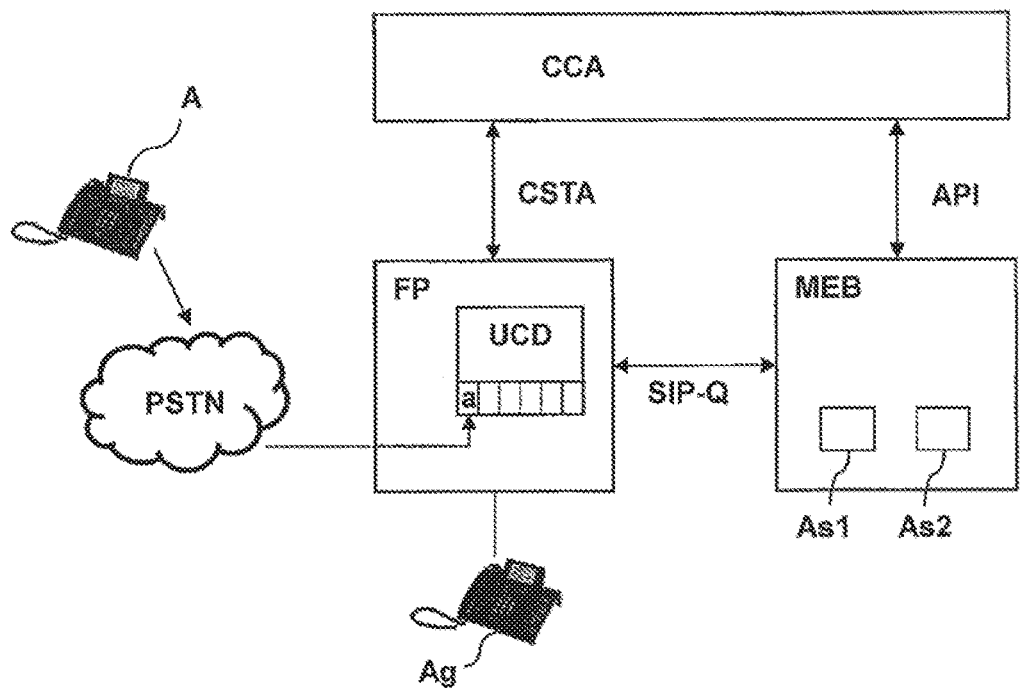
Figure 16:
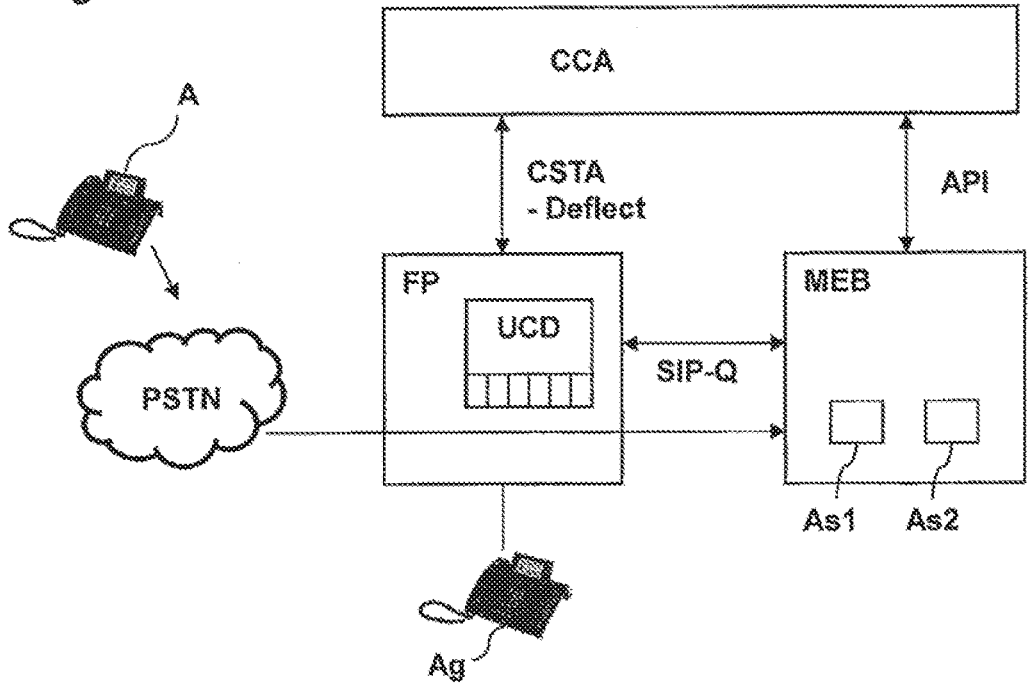
Figure 17:
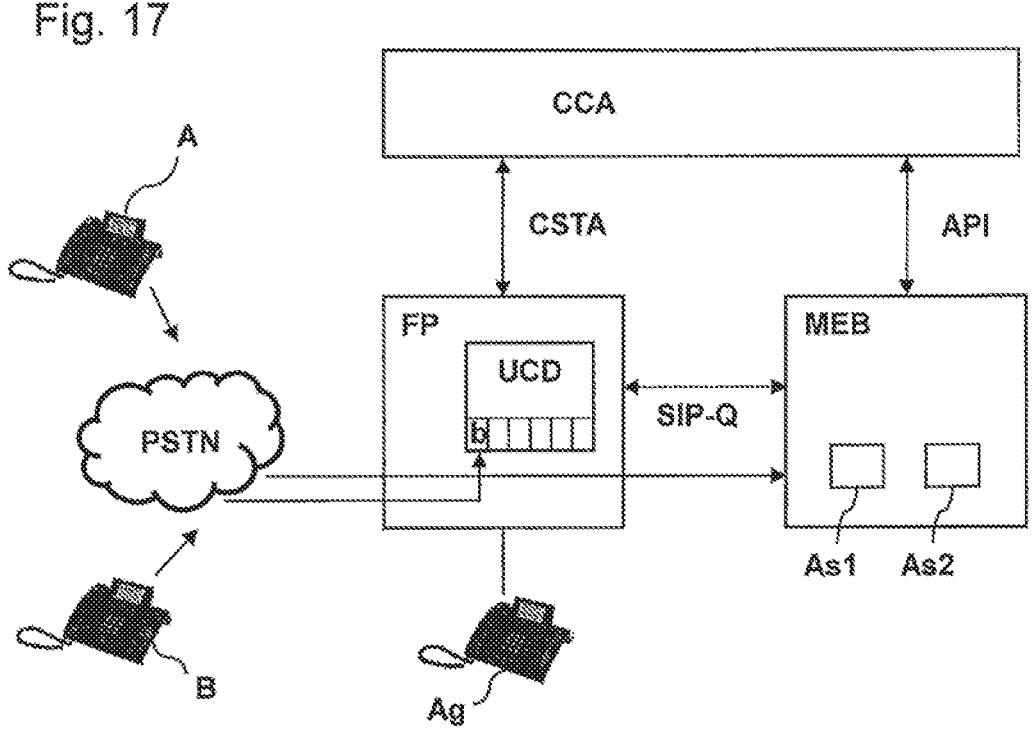

The invention's functionality is explained in comparison to a known call center according to the prior art with reference to FIGS. 15-17. The configuration shown in FIG. 15 is then very similar to the configuration according to the invention shown in FIG. 1. FIG. 15 shows an incoming call a that is sequenced into the queue WF of the switching unit FP. If no Agent is immediately available or if a greeting announcement As1 needs to be played, the caller A or the call a is switched by the call center application CCA out of the queue WF to a so-called SIP-Q trunk, which in the case of OpenScape Office and HiPath 3000 is done using a CSTA Deflect Call. The SIP-Q trunk then plays an announcement As1 from the call center through the announcement memory MEB. Because the announcement As1 is considered to be a fully qualified two-way conversation, the call a is removed from the queue WF. This situation is shown in FIG. 16. When another call b comes in from a caller B, this call b is sequenced in the position in the queue WF that was previously held by call a (which has now been switched to the announcement memory MEB). This situation is shown in FIG. 17. This illustration also shows that the call a has lost its position in the queue and with that its corresponding queue property.

Figure 2:
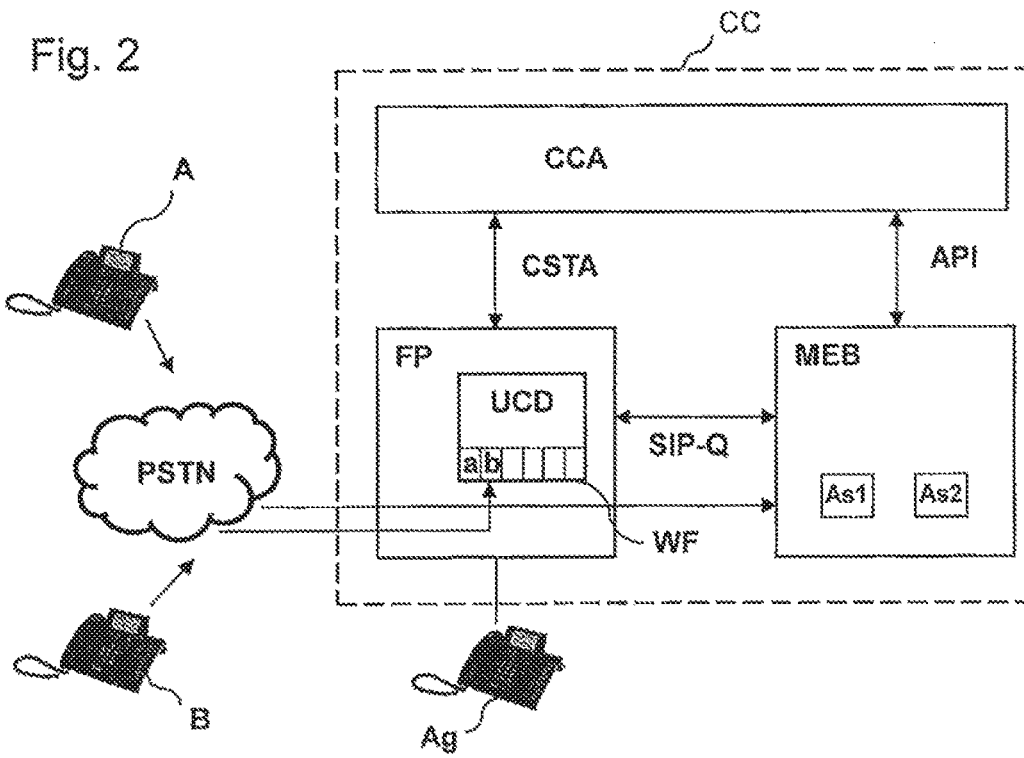

Differing from the existing described prior art, now the process according to the invention is such that call a—even though it is switched to the announcement memory MEB, see FIG. 1—keeps its position in the queue WF and also its related queue property. Next, a subsequent call b from a caller B is sequenced in the queue, as shown in FIG. 2, in the next-ranked position after the position of call a and therefore does not take the original queue position of call a. It is possible for call a to retain its original queue property because the call distribution unit UCD assigns a parameters siQ (short for staysInQueue) to call a, which keeps the corresponding queue property for call a or causes it to be kept. This happens because the CSTA Service Deflect Call used to connect the announcement As1 is marked with exactly this siQ parameter.

Using the siQ parameter also optimizes queue usage in the call center because queue usage in the application matches queue usage in the system as a whole. This also has the advantage that the absolute limit for the maximum number of waiting calls must be established at only one position. In the HiPath 3000 and OpenScape Office environments, this parameter is set in the system and reported to the call center application through CSTA.

Figure 3:
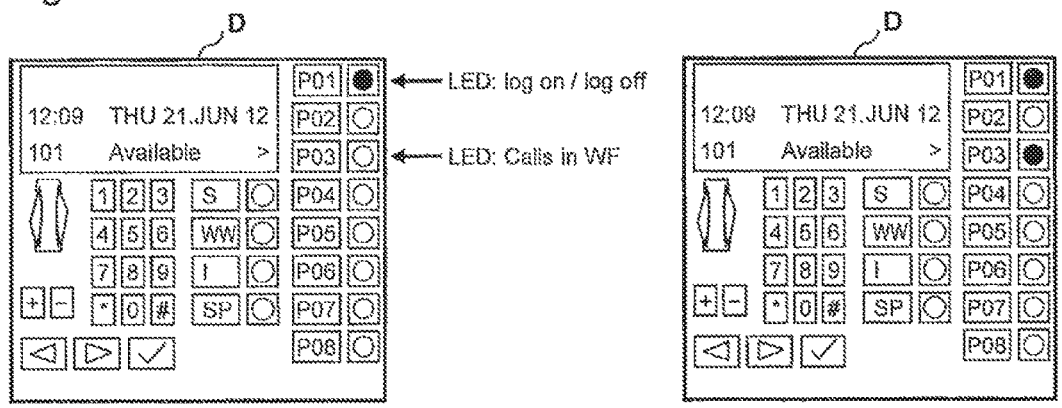
Figure 4:
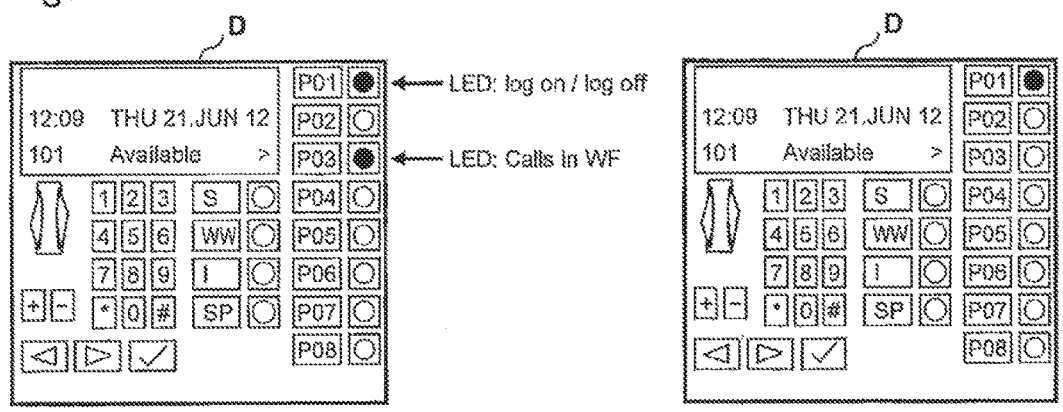

Using the siQ parameter for queue property retention also makes it possible for waiting calls to be signaled continuously to agents on their terminals. Corresponding to the situation as in FIG. 15, the waiting conversation according to the left-hand part of FIG. 3 can be signaled to the agent by means of an LED on his display D, with this left-hand part showing the situation before the call. The illuminated LED in the top right portion of the left-hand part of FIG. 3 indicates that the agent is logged on. The right-hand part of FIG. 3 shows the situation after the call is answered, also showing the number of calls in the queue next to the P03 field. As previously described, call a is removed from the queue WF in a call center CC according to the prior art, which is shown on the right side of FIG. 4 illustrating a display D in the call center CC (the left side of FIG. 4 corresponds to the right side of FIG. 3), because the call has lost its queue properties due to being forwarded to a SIP or SIP-Q media server and therefore this call can no longer be signaled to the agent.

Figure 5:
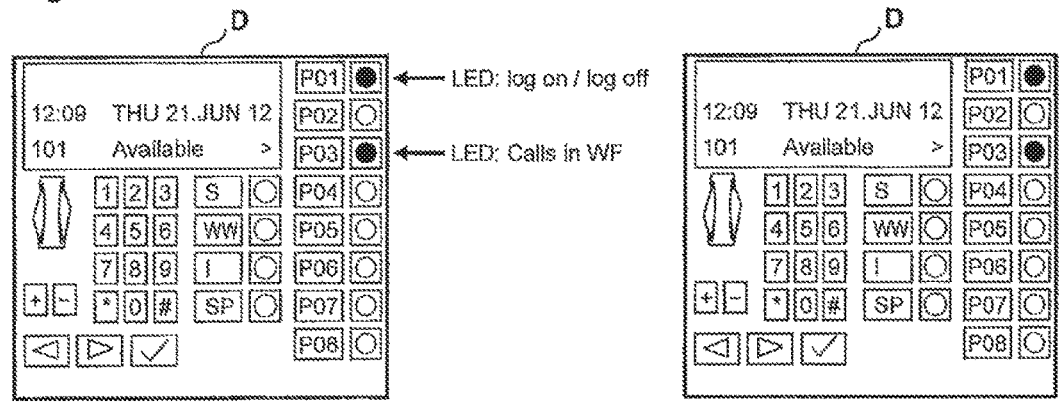

However, differing from the prior art, with the present invention (see FIG. 5) call a continues to be signaled to the agent when forwarded to the SIP or SIP-Q media server, as represented by the same illustration on the left and the right in FIG. 5, wherein the queue properties are retained as described. The illustration in FIG. 5 corresponds to the situation in FIG. 2.

Figure 6:
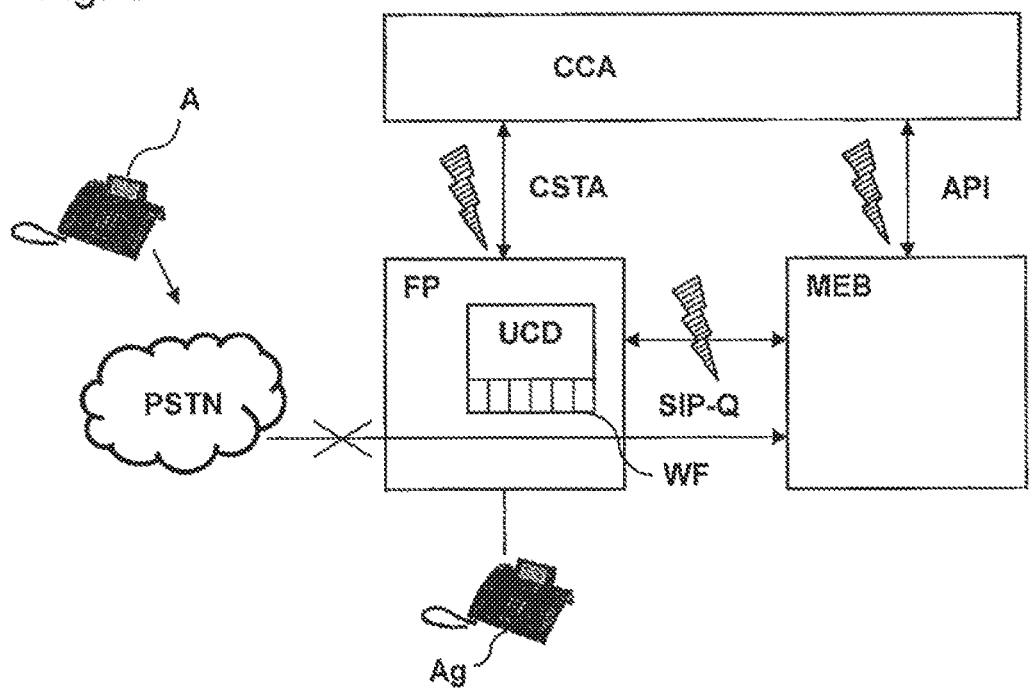

An additional advantage of the present invention is also evident with regard to reliability. In the event of the failure of a system component or of a connection consisting of a CSTA link between CCA/CSP and FP; SIP-Q path between FP and MEB; or API interface between CCA and MEB, while a call center announcement As1 is playing through a media server, call a is lost in a call center according to the prior art, which is symbolically represented in FIG. 6.

Figure 7:
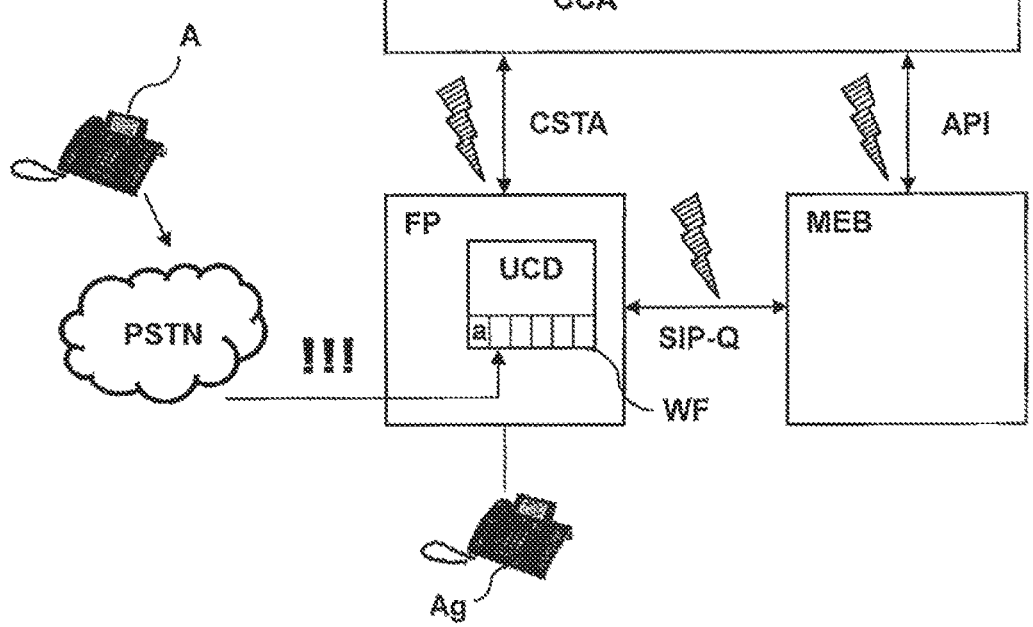

The situation is different when using the present invention, where the queue properties of the call a used here as an example are retained using the siQ parameter. The result of this is that the call can be brought back automatically to the queue WF by the switching unit FP when the failure occurs—retaining, of course, the original queue properties—and the call is not lost. This is illustrated in FIG. 7, in which call a is shown in the queue WF. After call a has been sequenced back into the queue WF, call a can be distributed either by the call center application CCA or the switching unit FP depending on the type of partial or total failure.

The way one or more embodiments may work shall be described with reference to FIGS. 8-14, depending on the component distribution as found in OpenScape Office and HiPath 3000. The announcement is connected through a media server using SIP-Q but is not limited to that configuration. The call center application CCA controls the platform using CSTA and reaches the media server through a program interface.

Figure 8:
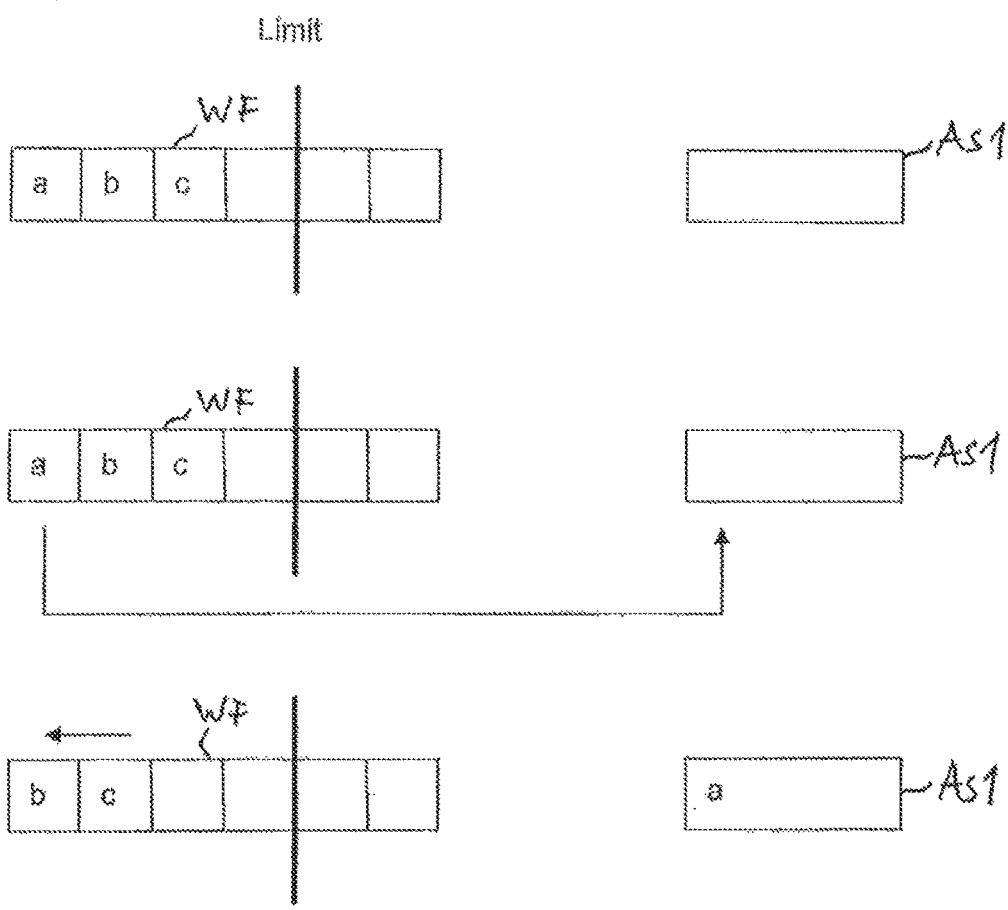
Figure 9:
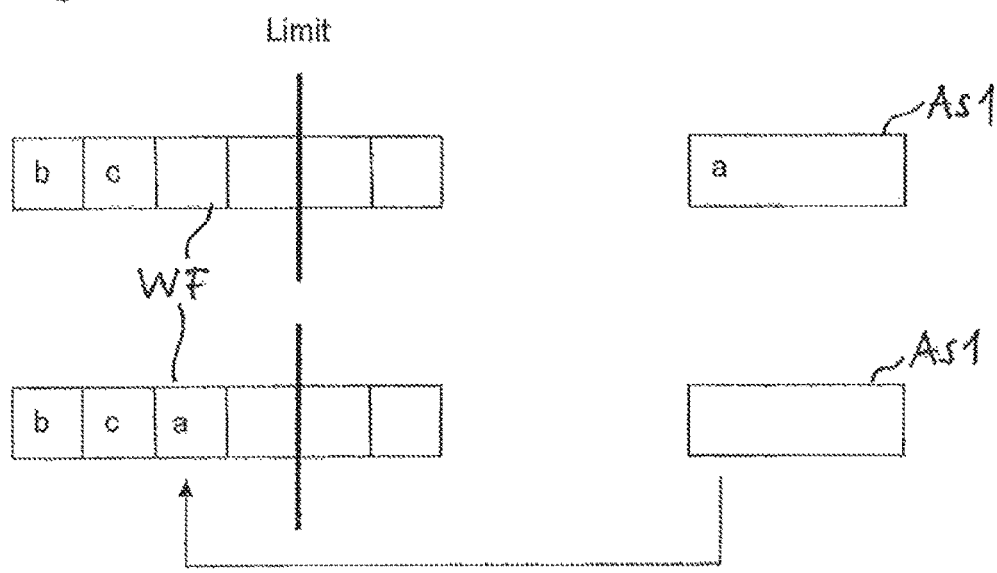

According to FIG. 8, in a call center according to the prior art, a call a is directed to the announcement As1 (see center image), and calls b and c move up in the queue WF as shown in the lower part of FIG. 8; call b thus takes the original position of call a. After the end of the announcement, according to FIG. 9, call a is sequenced back into the queue WF and specifically in the last position in the priority sequence, where call c was originally located. The situation shown in FIG. 9 therefore represents a status in which the queue WF is not filled up to the maximum number or the limit designated by a perpendicular separator bar, and so more than the absolutely necessary places for resequencing calls that are coming back (also designated as "reserve", shown here as above or to the right of the limit) have remained available.

Figure 10:
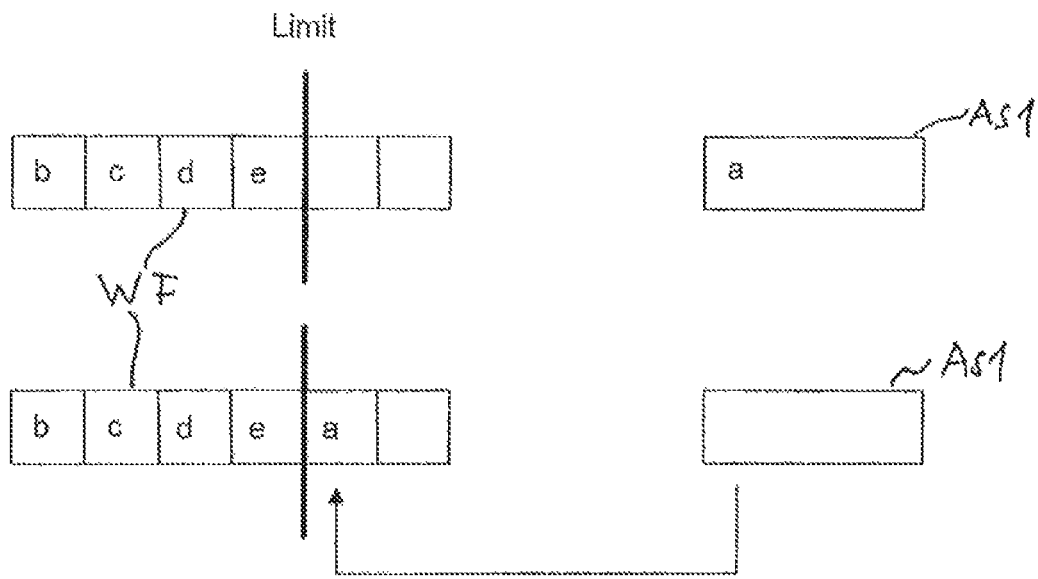

FIG. 10, on the other hand, shows the situation in which call a is sequenced back into the queue WF by the media server after the end of the announcement, with all places up to the limit occupied. Therefore, call a is sequenced into one of the reserve positions (i.e., positions located over the limit).

Figure 11:
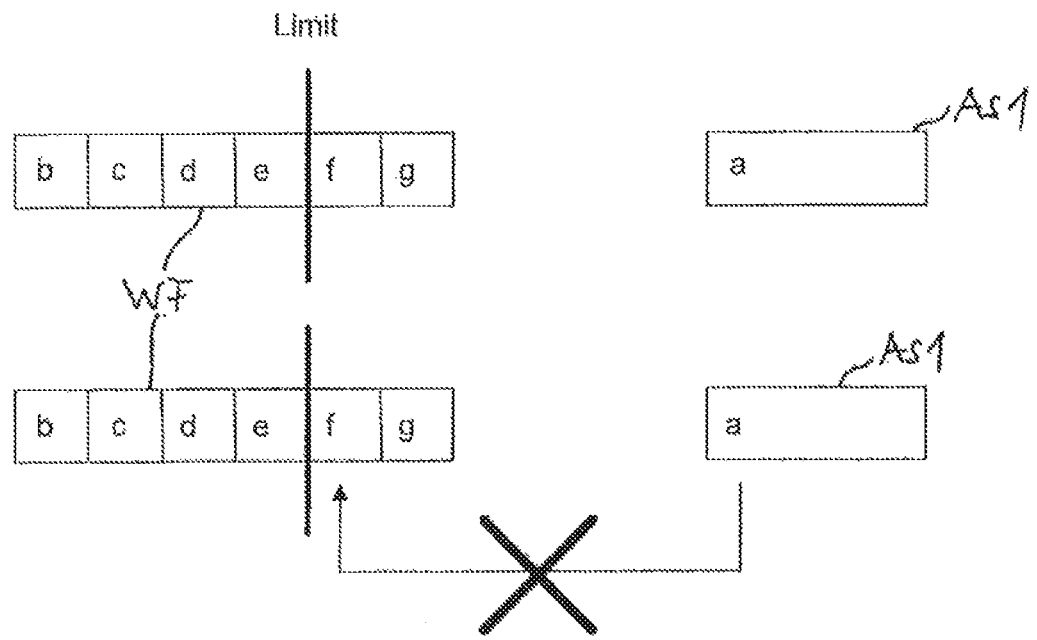

An even more extreme situation is shown in FIG. 11, in which a call a can no longer be sequenced into the queue WF by the media server after the end of the announcement, because the queue is completely full (including the reserve places). This means that, in this situation, call a is lost in the call center CC according to the prior art.

Figure 12:
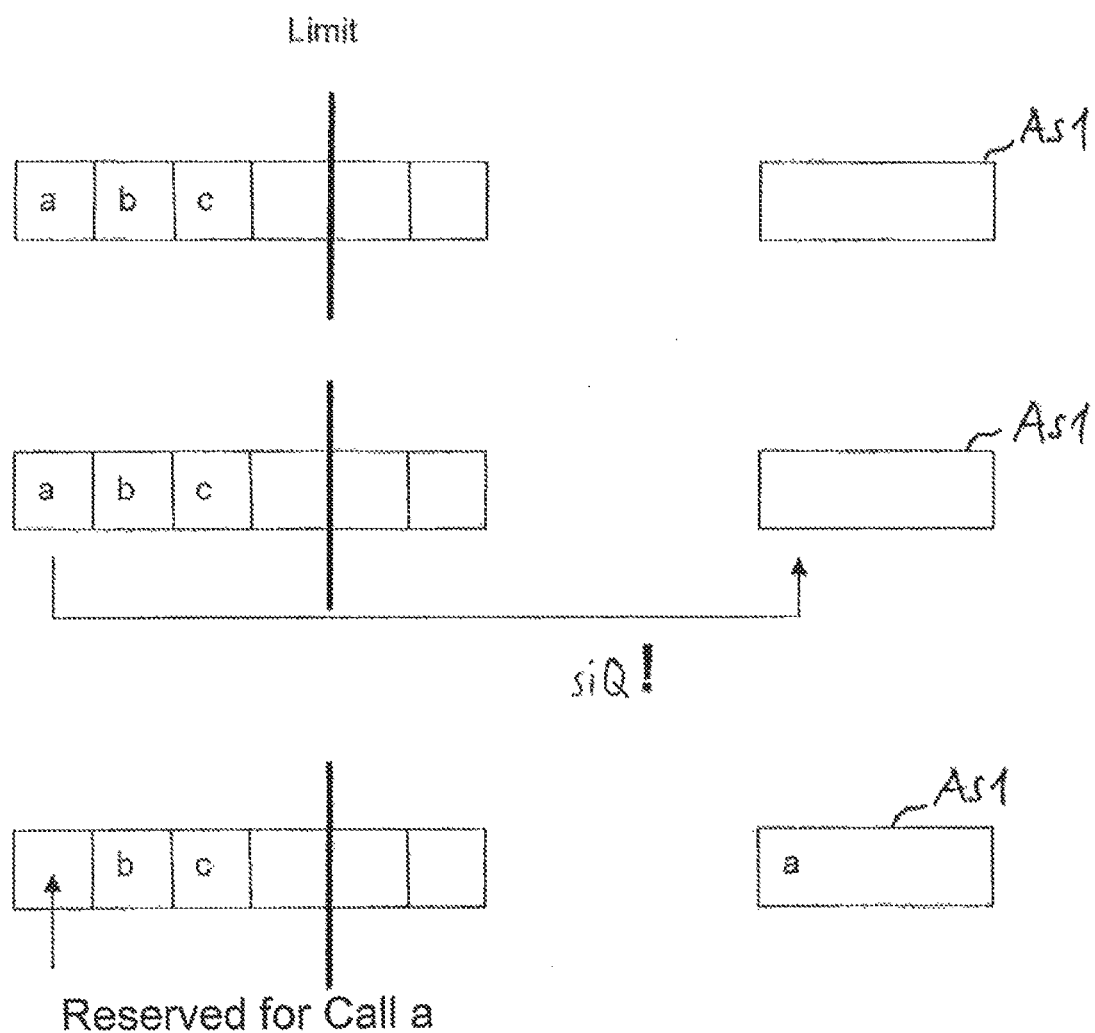
Figure 13:
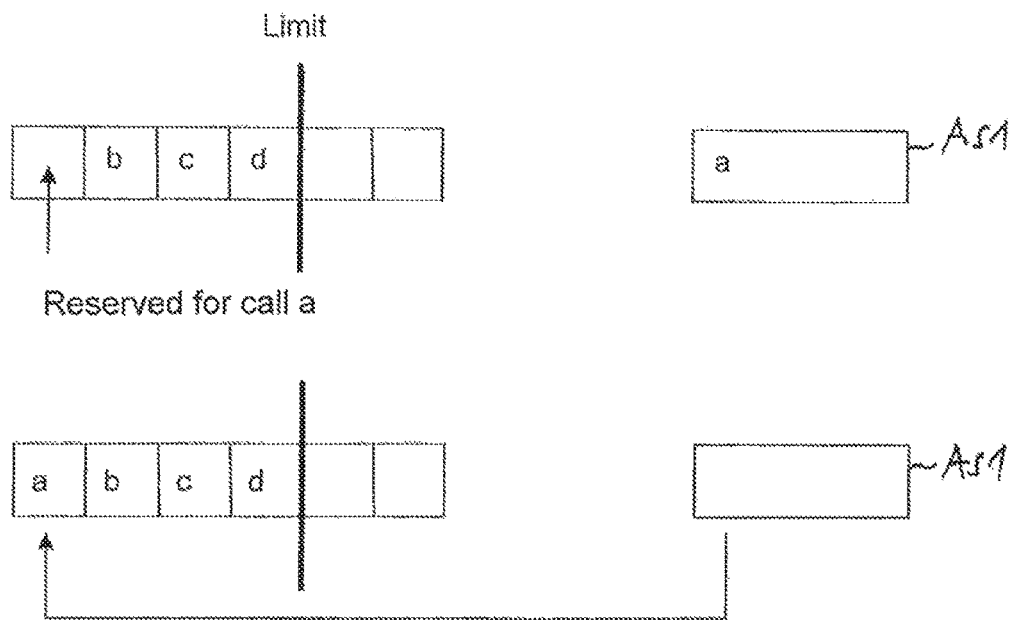
Figure 14:
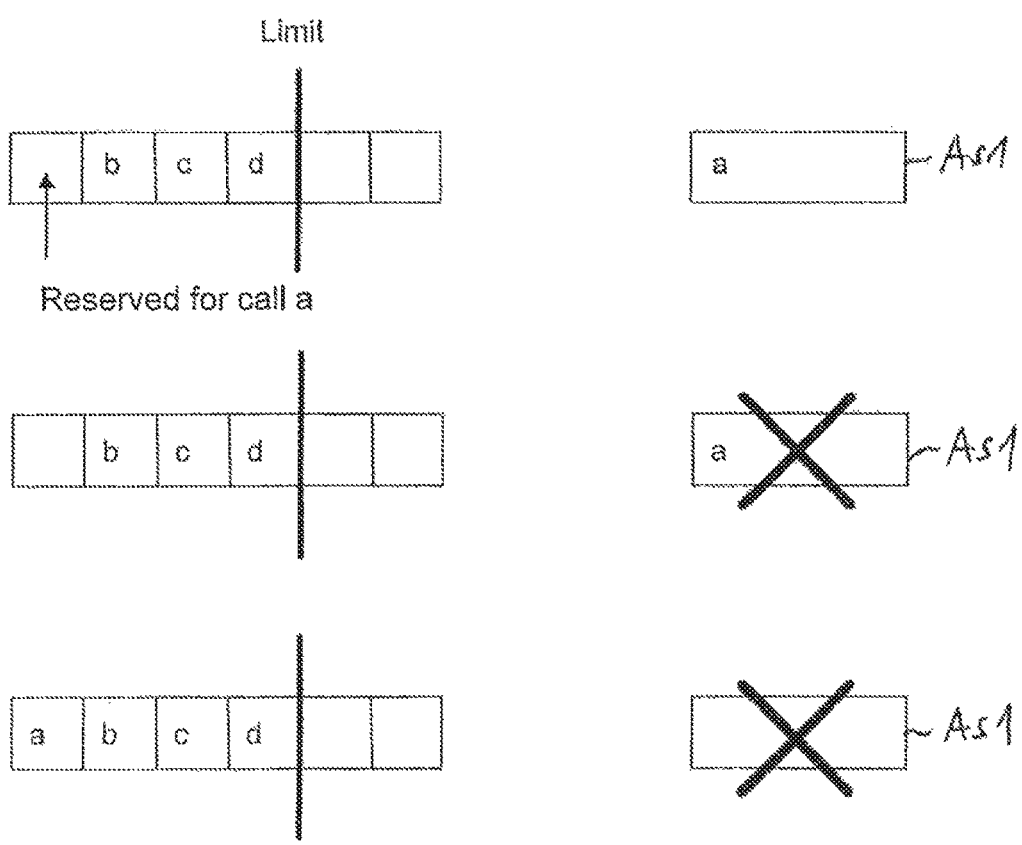

Alternatively, the situation using the present invention is shown, as can be seen with reference to FIGS. 12-14. According to FIG. 12, call a is directed to the media server's announcement, and because this forwarding is marked with the siQ parameter, the original position of call a in the queue WF is kept. According to FIG. 13, as soon as the announcement has ended, with the invention call a can be sequenced back into the queue WF at its original place or position. Even if a system component fails, such as the call center application, for example, a similar scenario occurs: call a, switched to the announcement according to the upper part of FIG. 14, is automatically returned through the system and integrated back into its original position in the queue WF. This significantly increases the reliability and emergency processing of the invented telecommunication system.

From the previously described sequence it can be seen that using the siQ parameter guarantees that an application-driven conversation does not lose the current queue properties, in particular the position and wait time, when a two-way announcement As1 is connected, but instead the current queue properties for this call a remain available. This guarantees the following, among other things:

The resequencing of call a to the original queue position and not to a lower-ranked position,
identical queue usage in the system and in the application,
optimal utilization of the queue,
maximum utilization of the queue, because no spaces have to be reserved in the queue for resequencing calls connected to announcements,
preservation of total wait time,
improved displays for agents.

According to embodiments of the present invention, improved emergency processing is possible in the event that the call center application is temporarily unavailable, for example.

Announcements can be brought back to the queue WF and redistributed by the system, and do not necessarily have to be removed. This means that the affected calls are not lost.

It should be noted that the SIP-Q media server used in the preceding illustrations of OpenScape Office is equivalent to an SIP media server with respect to the required functionality of this invention, for which an OpenScape media server can also be assumed as an example.

In addition, it should be emphasized that the use of the siQ parameter in CSTA is only an example, and a corresponding similar marking of the call applies to call center applications connected through SIP or other protocols.

It should be noted that the features of the invention described by referencing the presented embodiments, for example the type and configuration of the parameters, control commands, protocols, and hardware components, can also be present in other embodiments or variations hereof, unless stated otherwise or prohibited for technical reasons.

LIST OF REFERENCE CHARACTERS

A, B=telecommunication terminal/Caller
a-g=call
Ag=agent terminal
As1=two-way announcement
As2=one-way announcement
ASV=application server
CC=telecommunication system/call center
CCA=call center application
D=Display
FP=switching unit
MEG=announcement memory/media server
siQ=parameter
PSTN=telephone network
UCD=call distribution unit
WF=queue

We claim:

1. A method for utilizing a telecommunication system, the telecommunication system being configured to connect at least one caller terminal to at least one agent terminal, the method comprising:
    the telecommunication system managing a queue so that a first call received by the telecommunication system is entered into the queue and has a first priority in the queue, the telecommunication system comprising a switch device and non-transitory memory, the telecommunication system connectable to a network via which the first call is receivable;
    the telecommunication system allocating a first parameter to the first call in the queue;
    the telecommunication system removing the first call from the queue for the first call to be connected with a two-way announcement;
    the telecommunication system managing the queue while the first call is removed from the queue and is assigned to the two-way announcement such that the first priority of the first call is maintained in the queue via the allocated first parameter while the first call is removed from the queue and is assigned to the two-way announcement; and
    the telecommunication system signaling to at least one agent terminal that the first call is in the queue while the first call is removed from the queue and is assigned to the two-way announcement via the allocated first parameter.

2. The method of claim 1, wherein the managing of the queue while the first call is removed from the queue and is assigned to the two-way announcement such that the first priority of the first call is maintained in the queue via the allocated first parameter while the first call is removed from the queue and is assigned to the two-way announcement comprises at least one of:
    the telecommunication system increasing a priority of the first priority of the first call in the queue after at least one other higher priority call is removed from the queue while the first call is removed from the queue and is assigned to the two-way announcement, and
    the telecommunication system continuing a total wait time count for the first call such that the total wait time count for the first call since the first call initially entered the queue continues without interruption via the allocated first parameter while the first call is removed from the queue and is assigned to the two-way announcement.

3. The method of claim 1, wherein the managing of the queue while the first call is removed from the queue and is assigned to the two-way announcement such that the first priority of the first call is maintained in the queue via the allocated first parameter while the first call is removed from the queue and is assigned to the two-way announcement comprises all of:
    the telecommunication system increasing a priority of the first priority of the first call in the queue after at least one other higher priority call is removed from the queue while the first call is removed from the queue and is assigned to the two-way announcement, and
    the telecommunication system continuing a total wait time count for the first call such that the total wait time count for the first call since the first call initially entered the queue continues without interruption via the allocated first parameter while the first call is removed from the queue and is assigned to the two-way announcement.

4. The method of claim 1, comprising
    the telecommunication system maintaining properties of the first call in the queue in response to a component failure of the switch device of the telecommunication system via the first parameter.

5. The method of claim 1, comprising:
    the telecommunication system switching the first call from the queue to the two-way announcement via the switch device to remove the first call from the queue and assign the first call to the two-way announcement after the first parameter is allocated to the first call; and
    the telecommunication system returning the first call to the queue after the first call was removed from the queue and assigned to the two-way announcement such that the first call has the first priority within the queue identified by the first parameter at a time the first call is returned to the queue.

6. The method of claim 5, wherein the managing of the queue while the first call is removed from the queue and is assigned to the two-way announcement such that the first priority of the first call is maintained in the queue via the allocated first parameter while the first call is removed from the queue and is assigned to the two-way announcement comprises:
    the telecommunication system maintaining a total wait time count for the first call, the total wait time count identifying a total time period for the first call since the first call initially entered the queue, the maintaining of the total wait time count for the first call being maintained such that the total wait time count for the first call continues without interruption via the allocated first parameter while the first call is removed from the queue and is assigned to the two-way announcement such that the total time period for the first call includes an entirety of time in which the first call was removed from the queue and was assigned to the two-way announcement.

7. The method of claim 6, comprising
the telecommunication system maintaining properties of the first call in the queue in response to a component failure of the switch device of the telecommunication system via the first parameter.

8. The method of claim 1, wherein the telecommunications system is included in a call center.

9. The method of claim 8, wherein the non-transitory memory is communicatively connected to the switch device.

10. The method of claim 8, wherein the switch device performs the managing of the queue so that the first call received by the telecommunication system is entered into the queue and has the first priority in the queue.

11. The method of claim 10, wherein the switch device also performs the allocating of the first parameter to the first call in the queue, removing of the first call from the queue for the first call to be connected with the two-way announcement, managing the queue while the first call is removed from the queue and is assigned to the two-way announcement such that the first priority of the first call is maintained in the queue via the allocated first parameter while the first call is removed from the queue and is assigned to the two-way announcement and the signaling to the at least one agent terminal that the first call is in the queue while the first call is removed from the queue and is assigned to the two-way announcement via the allocated first parameter.

12. The method of claim 1, wherein the managing of the queue while the first call is removed from the queue and is assigned to the two-way announcement such that the first priority of the first call in the queue is maintained via the allocated first parameter while the first call is removed from the queue and is assigned to the two-way announcement comprises:
the telecommunication system increasing a priority of the first priority of the first call in the queue after at least one other higher priority call is removed from the queue while the first call is removed from the queue and is assigned to the two-way announcement; and
the telecommunication system returning the first call to the queue after the first call is removed from the queue and is assigned to the two-way announcement and after the priority of the first priority is increased such that the first call has the first priority within the queue identified by the first parameter when the first call is returned to the queue.

13. The method of claim 12, wherein the two-way announcement is stored in the non-transitory memory, the non-transitory memory being communicatively connected to the switch device of the telecommunication system.

14. A telecommunication apparatus, comprising:
a switch connected to non-transitory memory;
the switch configured to provide a queue for calls received by the switch, each of the calls in the queue having a queue property specific to that call that identifies a priority for that call in the queue, the switch configured to switch a call from the queue to a terminal of an agent;
the switch configured to allocate a parameter to a call of the queue assigned to a two-way announcement stored in non-transitory memory that is communicatively connectable to the switch that causes the queue property of that call to be maintainable while that call is removed from the queue and is assigned to the two-way announcement; and
the switch is configured to signal the call as being in the queue to the agent terminal while the call is removed from the queue and is assigned to the two-way announcement via use of the parameter.

15. The telecommunication apparatus of claim 14, wherein:
the queue property comprises a total wait time count identifying a total time period the call has waited since the call first entered the queue for the call since the call initially entered the queue, the total wait time count identifying a total time period that has passed since the call initially entered the queue; and
the parameter is configured such that the total wait time count for the call is maintainable by the switch such that the total wait time count for the call continues via the allocated parameter while the call is removed from the queue and is assigned to the two-way announcement such that the total time period includes an entirety of time in which the call was removed from the queue and was assigned to the two-way announcement.

16. The telecommunication apparatus of claim 14, wherein the parameter is configured such that a priority of the call in the queue is increasable by the switch via the parameter while the call is removed from the queue and is assigned to the two-way announcement such that the priority of the call is the increased priority indicated by the parameter at a time the call is returned to the queue after the call is removed from the queue and was assigned to the two-way announcement.

17. A non-transitory computer readable medium having a program product stored thereon, the program product defining a method that is performed by a telecommunication system that executes the program product, the telecommunication system having a non-transitory memory and a switch device, the method comprising:
the telecommunication system managing a queue so that a first call received by the telecommunication system is entered into the queue and has a first priority in the queue;
the telecommunication system allocating a first parameter to the first call in the queue;
the telecommunication system removing the first call from the queue for the first call to be connected with a two-way announcement;
the telecommunication system managing the queue while the first call is removed from the queue and is assigned to the two-way announcement such that the first priority of the first call is maintained in the queue via the allocated first parameter while the first call is removed from the queue and is assigned to the two-way announcement; and
the telecommunication system signaling to at least one agent terminal that the first call is in the queue while the first call is removed from the queue and is assigned to the two-way announcement via the allocated first parameter.

18. The non-transitory computer readable medium of claim 17, wherein the managing of the queue while the first call is removed from the queue and is assigned to the two-way announcement such that the first priority of the first call is maintained in the queue via the allocated first parameter while the first call is removed from the queue and is assigned to the two-way announcement comprises:
the telecommunication system increasing a priority of the first priority of the first call in the queue after at least one other higher priority call is removed from the queue while the first call is removed from the queue and is assigned to the two-way announcement.

19. The non-transitory computer readable medium of claim 18, wherein the managing of the queue while the first call is removed from the queue and is assigned to the two-way announcement such that the first priority of the first call is maintained in the queue via the allocated first parameter while the first call is removed from the queue and is assigned to the two-way announcement also comprises:

the telecommunication system returning the first call to the queue after the first call is removed from the queue and is assigned to the two-way announcement and after the priority of the first priority is increased such that the first call has the first priority within the queue identified by the first parameter when the first call is returned to the queue.

20. The non-transitory computer readable medium of claim 17, wherein the method also comprises:

the telecommunication system maintaining properties of the first call in the queue in response to a component failure of the switch device via the first parameter.

\* \* \* \* \*